United States Patent [19]

Bott

[11] 4,175,682

[45] Nov. 27, 1979

[54] LUGGAGE RACK

[76] Inventor: John A. Bott, 931 Lakeshore Dr., Grosse Pointe Shores, Mich. 48236

[21] Appl. No.: 807,071

[22] Filed: Jun. 16, 1977

[51] Int. Cl.$^2$ .............................................. B60R 9/04
[52] U.S. Cl. .................................... 224/309; 224/316; 403/217
[58] Field of Search .......... 224/29 R, 42.1 R, 42.1 D, 224/42.1 E, 42.1 F, 42.1 G; 296/1 S; 403/170, 174, 217, 219

[56] References Cited

U.S. PATENT DOCUMENTS

| 3,253,755 | 5/1966 | Bott | 224/42.1 E |
| 3,853,254 | 12/1974 | Helm | 224/42.1 E X |

FOREIGN PATENT DOCUMENTS 708776  5/1972  United Kingdom ...................... 403/217

Primary Examiner—Trygve M. Blix
Assistant Examiner—Winston H. Douglas
Attorney, Agent, or Firm—Harness, Dickey & Pierce

[57] ABSTRACT

An automobile luggage rack having spaced side members and spaced cross members is supported at the front and rear corners on stanchions which form part of the rack and which are firmly secured to the roof of an automobile. The cross members are of tear-drop cross section and may be angularly adjusted to minimize wind noise by interchanging retaining members located adjacent the ends of the cross rails. The stanchions, retainer members and side rails are secured together by a single threaded fastening element located at each of the four corners of the rack, whereby to minimize assembly time.

4 Claims, 5 Drawing Figures

LUGGAGE RACK

BACKGROUND AND SUMMARY OF THE INVENTION

While luggage racks for automobiles have been made heretofore, the present rack incorporates tubular cross rails provided with a streamline cross section which functions to reduce wind noise, with the rotational or angular position of the cross rails being modifiable by means of retaining members in the form of flanged bosses provided at the opposite ends of the cross rails. By having the bosses formed separately from the associated stanchions, different bosses may be utilized for racks adapted for different style automotive vehicles without requiring that the entire stanchions per se be redesigned for each application. The bosses are secured to the associated stanchions and side rails by a novel locking arrangement by which only a single fastening element (screw) is required at each corner of the rack to secure the respective components together.

It is accordingly a general object of the present invention to provide a new and improved vehicle luggage rack.

It is a more particular object of the present invention to provide a new and improved luggage rack wherein the support means for the transversely extending cross rail may be modified independently of the associated stanchion members.

It is yet another object of the present invention to provide a new and improved luggage rack of the above character wherein the cross rails, side rails and associated stanchions may be connected by a single fastening element at each corner of the rack.

It is still a further object of the present invention to provide a new and improved luggage rack, as above described, which has an aesthetically pleasing appearance, is of a durable construction and will have a long and effective operational life.

Other objects and advantages of the present invention will become apparent from the following detailed description, taken in conjunction with the accompanying drawings.

BRIEF DESCRIPTION OF THE DRAWINGS

FIG. 5 is a fragmentary transverse cross-sectional view taken substantially along the line 5—5 of FIG. 3.

DETAILED DESCRIPTION OF THE PREFERRED EMBODIMENT

Figure 1:
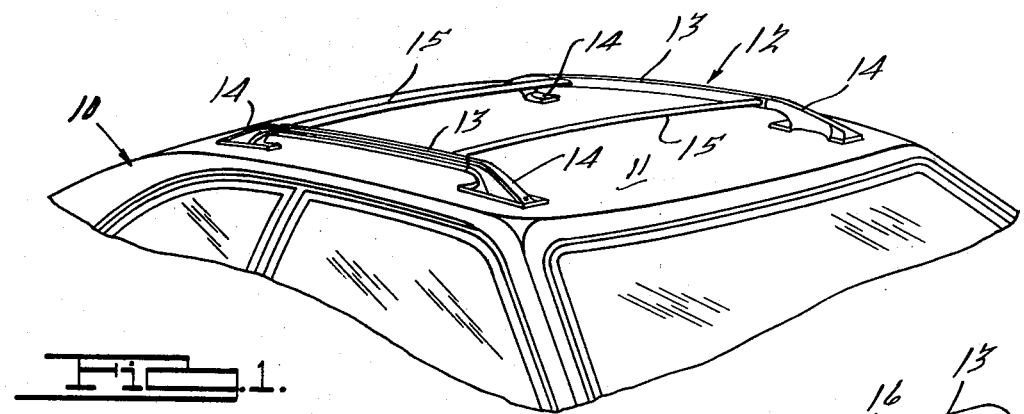
FIG. 1 is a perspective view of the upper portion of the vehicle body having a luggage rack of the present invention secured to the roof thereof.
Figure 2:
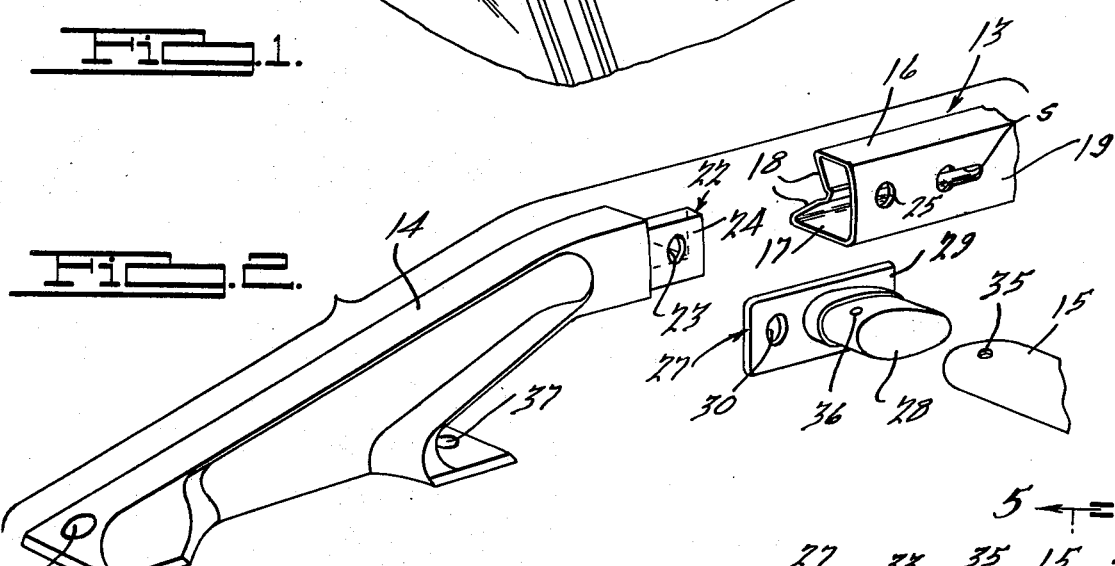
FIG. 2 is an exploded view of one corner of the luggage rack of the present invention.
Figure 3:
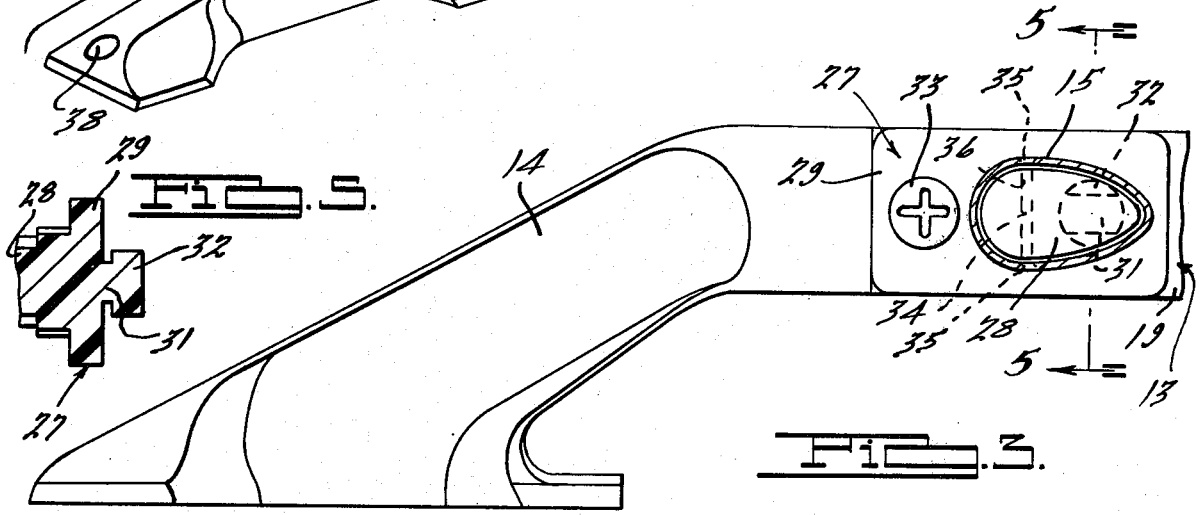
FIG. 3 is a view of the structure illustrated in FIG. 2, when assembled and in condition for installation on the roof.
Figure 4:
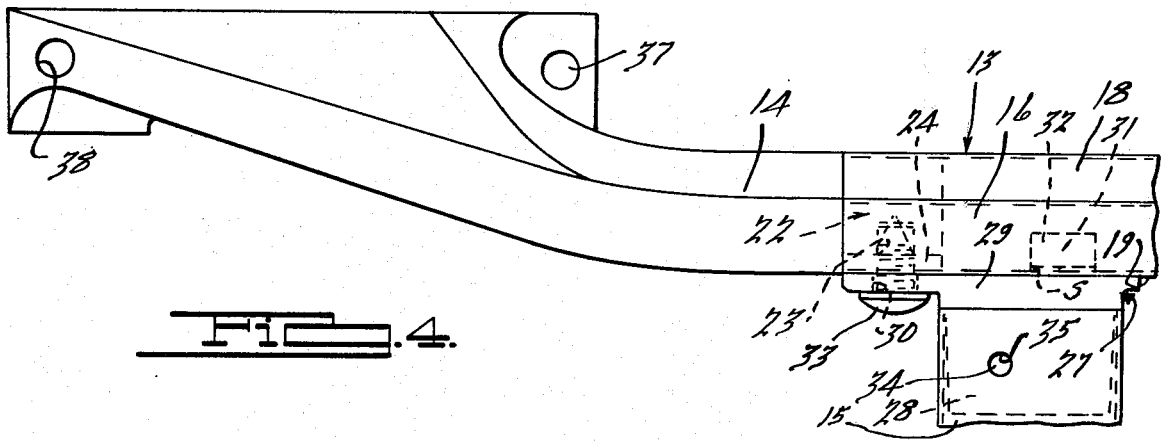
FIG. 4 is a plan view of the structure illustrated in FIG. 3.

Referring now in detail to the drawings and in particular to FIG. 1 thereof, an automotive vehicle 10 is shown as comprising a luggage rack 12 mounted on the roof portion 11 thereof, which luggage rack 12 is constructed in accordance with the principles of the present invention hereinafter to be described. In particular, the luggage rack 12 embodies a pair of roll-formed, extruded or otherwise fabricated tubular side rails or members 13 which are arranged in spaced parallelism and extend longitudinally of the vehicle 10. The opposite ends of the side rails 13 are supported upon stanchions 14, and a pair of cross members or rails 15 extend transversely between the side rails 13 at the forward and rearward ends of the rack 12. As best seen in FIG. 2, the side rails are formed with spaced parallel upper and lower sections 16 and 17, respectively, and with inwardly converging outer side sections 18 and with a generally flat or planar interior side section 19.

Each of the stanchions 14 is provided with a longitudinally projecting section 22 adapted to be telescopically received within the adjacent end of the associated side rail 13, with each of the end sections 22 being formed with a laterally extending threaded aperture 23 located in the vertically extending side portion 24 thereof. The opposite ends of the side rails 13 have correlative apertures 25 formed therein which are adapted for alignment with the apertures 23 upon telescopic engagement of the end sections 22 into the ends of the side rails 13, whereby to permit securing the rails 13 and stanchions 14 by a suitable threaded fastening member, such as a screw, bolt or the like, hereinafter to be described. Each end of the side rails 13 is also provided with generally longitudinally extending "keyhole"-shaped slot S on the interior side section 19 thereof, which slot S is spaced longitudinally from the adjacent apertures 25, as seen in FIG. 2.

In accordance with the present invention, the opposite ends of the cross rails 15 are operatively supported by means of a plurality of retaining members, generally designated by the numeral 27, each of which includes a laterally extending boss portion 28 adapted to be telescopically received within the adjacent end of the associated cross rail 15. Each of the retaining members 27 also includes a flanged end portion 29 adapted to be secured to the interior side section 19 of the associated side rail 13, the flange portions 29 being formed with a suitable aperture 30 and with a laterally outwardly extending locking element 31 having an enlarged head portion 32. Upon assembly of the luggage rack 12 of the present invention, the side rails 13 are assembled onto the associated end sections 22 of the stanchions 14 and the retainer members 27 are arranged adjacent the interior side sections 19 of the rails 13 with the head portions 32 of the locking elements 31 being inserted into the slots S and moved longitudinally therein to a position wherein the apertures 30 are aligned with the apertures 25 and 23 of the associated side rails 13 and stanchions 14. Thereafter, a suitable threaded fastening element, such as a screw, bolt or the like 33, may be inserted through the apertures 25 and be threadably engaged with the aperture 23. The cross rails 15 may then be secured to the retaining members 27 by having the boss portions 28, which are preferably of the complementary configuration with respect to the interior cross sectional shape of the cross rails 15, inserted into the opposite ends thereof, whereupon suitable fastening means, such as locking pins or the like 34, may be inserted through pairs of apertures 35 of each of the cross rails 15 and aligned apertures 36 in the associated boss portion 28. Thereafter, the entire rack 12 may be secured to the roof portion 11 of the vehicle 10 by means of suitable screws, bolts or the like (not shown) which extend through downwardly directed openings 37 and 38 at the opposite ends of the base portion of each of the stanchions 14, as is well known in the art.

One particularly important feature of the present invention resides in the fact that the rack 12 will find universality of application and overcome a serious problem which has existed in prior art luggage racks. In particular, because each luggage rack design is intended to be applicable to a variety of different automobile models and styles, there has heretofore been a problem insofar as the wind noise created due to the wind passing over and around the cross rails 15 which are typically of a tear-drop configuration in transverse cross section. Such wind noise can be reduced or minimized by varying or rotating the cross rails about their longitudinal axes; however, in prior art designs it has been necessary to re-tool the entire stanchion when so modifying the rotational position of the cross rails due to the fact that the boss portions 28 were formed integrally of the stanchions. In the disclosed construction on the other hand, the retainer members 27 are formed separately from the associated stanchions 14 and may have the construction thereof varied considerably in order to modify the rotational position of the cross rails 15 without in any way affecting the construction of the stanchions 14. Thus, significant manufacturing costs are saved. A related advantage of the present invention resides in the fact that the retainer members 27 may be fabricated of a different material from the stanchions 14, such as out of a suitable molded plastic material, as is indicated in FIG. 5.

Another feature of the present invention resides in the fact that through the provision of the keyhole slots S and locking elements 31, only a single fastening means is required at each of the four corners of the rack 12 in order to secure the various component parts thereof together. This, of course, will result in important savings in manufacturing costs, as well as in assembly time and effort.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

I claim:
1. In a luggage rack for an automobile,
   a pair of spaced apart side members,
   at least one transversely extending cross member,
   a pair of stanchions located one at each end of said cross member, with each of said stanchions being associated with one end of one of said side members,
   a pair of retainer members associated one with each of said stanchions and with one end of said cross member, and
   each of said stanchions having a projecting end portion adapted for telescopic engagement with the end of the associated side member,
   each of said side members having an opening and a keyhole slot formed on the interior side thereof,
   each of said stanchions having an opening which is aligned with the opening in the associated side members upon telescopic engagement of said stanchions therewith,
   each of said retainer members having an opening and an outwardly projecting boss which is insertable into one end of the keyhole slot of the associated side member and moveable longitudinally therewithin to a position wherein said retainer opening is aligned with said stanchion and side members openings of the associated side member and stanchion, and a pair of fastening members wherein a fastening member extends through said aligned openings of each associated set of retainer members, stanchions and side members.

2. The invention as set forth in claim 1, wherein said retainer members comprise bosses telescopically engageable with the adjacent ends of said cross member.

3. The invention as set forth in claim 1 which includes a pair of longitudinally spaced transversely extending cross members.

4. The invention as set forth in claim 3, wherein said cross members are of non-symmetrical cross section with one edge presented toward the air which passes over the roof of the automobile when the car is operating forwardly.

* * * * *